US005573745A

United States Patent [19]
Li et al.

[11] Patent Number: 5,573,745
[45] Date of Patent: *Nov. 12, 1996

[54] HIGH MICROPORE VOLUME LOW SILICA EMT-CONTAINING METALLOSILICATES

[75] Inventors: Hong-Xin Li, Allentown; Charles G. Coe, Macungie; Thomas R. Gaffney, Allentown, all of Pa.; Yanliang Xiong, Belgium Hevertee, Belgium; Johan A. Martens, Huldenbert, Belgium; Pierre A. Jacobs, Gooik, Belgium

[73] Assignee: Air Products and Chemicals, Inc., Allentown, Pa.

[*] Notice: The term of this patent shall not extend beyond the expiration date of Pat. No. 5,567,407.

[21] Appl. No.: 241,833

[22] Filed: May 12, 1994

[51] Int. Cl.⁶ .................................................. C01B 39/20
[52] U.S. Cl. .................... 423/700; 423/710; 423/DIG. 1; 502/79
[58] Field of Search .................................. 423/700, 710, 423/DIG. 21; 502/79

[56] References Cited

U.S. PATENT DOCUMENTS

| | | | |
|---|---|---|---|
| 3,123,441 | 3/1964 | Haden, Jr. et al. | 423/712 |
| 3,140,933 | 7/1964 | McKee . | |
| 3,411,874 | 11/1968 | Ciric | 423/709 |
| 3,415,736 | 12/1968 | Ciric | 208/111 |
| 3,798,311 | 3/1974 | Guth et al. | 423/710 |
| 4,714,601 | 12/1987 | Vaughan | 502/79 |
| 4,879,103 | 11/1989 | Vaughan | 423/DIG. 21 |
| 5,098,686 | 3/1992 | Delprato et al. | 423/702 |
| 5,116,590 | 5/1992 | Vaughan et al. | 423/703 |
| 5,152,813 | 10/1992 | Coe et al. | 95/103 |
| 5,258,058 | 11/1993 | Coe et al. | 95/95 |
| 5,393,511 | 2/1995 | Delprato et al. | 502/79 |

OTHER PUBLICATIONS

Martens, J. A. et al. "Phase Discrimination with ²⁹SI MAS NMR in EMT/FAU Zeolite Inter-growths." *J. Phys. Chem.* May 13, 1993: 5132–35.

Davis, Mark E. "Synthesis and Characterization of VPI-6, Another Intergrowth of Hexagonal and Cubic Faujasite." *Molecular Sieves* 1992: 60–69. (No month).

Lievens, J. L. et al. "Cation Site Energies in Dehydrated Hexagonal Faujasite (EMT)." *Zeolites* Jul./Aug. 1992: 698–705.

Kokotailo, G. T. and Ciric, J. "Synthesis and Structural Features of Zeolite ZSM-3." Molecular Sieve Zeolites–I. American Chemical Society 1971: 109–121 (No Month).

Vaughan, D. E. W. et al. "Synthesis and Characterization of Zeolite ZSM-20." Zeolite Synthesis, American Chemical Society 1989: 544–559. (No Month).

Meier, W. M. and Olson, D. H. "FAU" and EMT. *Atlas of Zeolite Structure Types.* Butterworth-Heinemann 1992: 88–89 and 96–97. (No Month).

Audler et al. "Twinning in Zeolite Y. Conversion of Fawasite into A New Zeolitic Structure" *J. Phys. Chem.* (1982) 86 581–584.

*Primary Examiner*—Karl Group
*Assistant Examiner*—David Sample
*Attorney, Agent, or Firm*—Geoffrey L. Chase

[57] ABSTRACT

The present invention is a composition, a synthesis of the composition and a method of using the composition for selectively adsorptively separating nitrogen from oxygen wherein the composition is a crystalline EMT with a Si/Al ratio less than 2.0 and a micropore volume determined in the sodium and/or potassium form of at least 0.20 cm³/g and a lithium cation exchange of at least 80%, preferably including an intergrowth with a crystalline FAU structure, wherein the pure or intergrowth compositions have the chemical formula:

$$M_{2/n}O:X_2O_3:(2.0 \text{ to } <4.0)SiO_2$$

wherein M=one or more metal cations having a valence of n, and X is selected from the group consisting of aluminum, gallium and boron, preferably aluminum.

4 Claims, 2 Drawing Sheets

HIGH MICROPORE VOLUME LOW SILICA EMT-CONTAINING METALLOSILICATES

FIELD OF THE INVENTION

The present invention is directed to the field of synthetic molecular sieves of the structure EMT and FAU/EMT having high micropore volume. More specifically, the present invention is directed to an intergrowth of cubic and hexagonal FAU/EMT crystals having such high micropore volume. The synthesis of the composition and use in adsorptive separations is also demonstrated.

BACKGROUND OF THE PRIOR ART

Both natural and synthetic crystalline aluminosilicates are known and may generally be described as alumino-silicates of ordered internal structure having the following general formula:

$$M_{2/n}O:Al_2O_3:YSiO_2:ZH_2O$$

where M is a cation, n is its valence, Y the moles of silica, and Z the moles of the water of hydration.

When water of hydration is removed from the crystalline aluminosilicates, highly porous crystalline bodies are formed which contain extremely large adsorption areas inside each crystal. Cavities in the crystal structure lead to internal pores and form an interconnecting network of passages. The size of the pores is substantially constant, and this property has led to the use of crystalline aluminosilicates for the separation of materials according to molecular size or shape. For this reason, the crystalline aluminosilicates have sometimes been referred to as molecular sieves.

The crystalline structure of such molecular sieves consists basically of three-dimensional frameworks of $SiO_4$ and $AlO_4$ tetrahedra. Isomorphous substituition of boron or gallium for aluminum in a zeolite framework may be achieved. The tetrahedra are cross-linked by the sharing of oxygen atoms, and the electrovalence of the tetrahedra containing aluminum is balanced by the inclusion in the crystal of a cation, e.g., alkali metal or alkaline earth metal ions or other cationic metals and various combinations thereof. These cations are generally readily replaced by conventional ion-exchange techniques.

The spaces in the crystals between the tetrahedra ordinarily are occupied by water. When the crystals are treated to remove the water, the spaces remaining are available for adsorption of other molecules of a size and shape which permits their entry into the pores of the structure.

Molecular sieves have found application in a variety of processes which include ion exchange, selective adsorption and separation of compounds having different molecular dimensions such as hydrocarbon isomers, and the catalytic conversion of organic materials, especially catalytic cracking processes.

U.S. Pat. No. 3,123,441 discloses a lithium aluminum silicate zeolite having a lithium oxide to alumina ratio of 1:1 and a silica to alumina ratio of 2:1.

U.S. Pat. No. 3,411,874 discloses the preparation of a zeolite ZSM-2 which has the chemical formula $M_{2/n}O:Al_2O_3:(3.3–4.0)SiO_2:ZH_2O$. The composition includes lithium as the M specie and is known to have utility for selective adsorption and separation of compounds, such as hydrocarbon isomers. The zeolite is synthesized from a single mixture over a period of from three days up to three months.

In U.S. Pat. No. 3,415,736, lithium-containing crystalline aluminosilicate compositions are disclosed which are broadly recited to include $(0.05–0.8)Li_2O:(0.95–0.2)Na_2O:Al_2O_3:(2.0–6)SiO_2:(0–9)H_2O$ specifically, $(0.3–0.8)Li_2O:(0.7–0.2)Na_2O:Al_2O_3:(2.8–4)SiO_2:(0–9)H_2O$. These zeolites are known as ZSM-3. They also are described as having utility in selective adsorptive separations, such as for hydrocarbon isomers. The crystalline ZSM-3 is recited to contain a hexagonal crystalline structure. The zeolite is typically synthesized from a combination of four solutions which form a gel from which the zeolite crystallizes over a period of hours or days.

In an article entitled, "Synthesis and Characterization of VPI-6" by Mark E. Davis, appearing in *Molecular Sieves*, (1992) pp 60–69, a crystalline zeolite having cubic and hexagonal intergrowth in the faujasite structure is disclosed. The synthesis of the zeolite involve aging a solution for 24 hours and indicates that aging is an important criteria of the synthesis. Specifically, the author of this article attempted to synthesize the zeolite in only the sodium cation form. As presented in FIG. 4 of the article, the micropore volume of VPI-6 is very low (<0.2 cc/g). The utility of the VPI-6 zeolite is recited to be as an adsorbent or ion exchange medium.

J. L. Lievens, et al. in an article "Cation Site Energies in Dehydrated Hexagonal Faujasite", appearing in ZEOLITES, 1992, vol. 12, July/August, pp 698–705, reviews properties of hexagonal faujasite designated as EMT. FAU/EMT intergrowths were also discerned in the studied EMT materials. Sodium was the cation which was involved in the cation site studies, and Si/Al ratios of 4.6 were specified.

U.S. Pat. No. 5,098,686 discloses faujasite compositions in which high Si/Al ratios are attempted, preferably above 3. Hexagonal and cubic structure mixtures are disclosed. All of the examples have compositions with Si/Al ratios above 3.7. Crown ethers were used in the synthesis as structure directing agents.

U.S. Pat. No. 5,116,590 discloses a zeolitic structure, ECR-35, which has a Si/Al ratio of 2:1 to 12:1, preferably 4. ECR-35 is an intergrowth of faujasite and Breck Structure Six (a nomenclature for hexagonal faujasite, subsequently EMT). Cation sites are occupied by tetraethylammonium and methyltriethylammonium cations.

J. A. Martens, et al. in an article entitled "Phase Discrimination with $^{29}$Si MAS MNR in EMT/FAU Zeolite Intergrowths", J. Phys. Chem. 1993, 97, pp 5132–5135, describes the evaluation of ZSM-2 and ZSM-3 in lithium exchanged format to determine the content and extent of any EMT and FAU phases in their crystal structures.

G. T. Kokotailo, et al., reported in "Synthesis and Structural Features of Zeolite ZSM-3", Molecular Sieve Zeolites—I, Amer. Chem, Soc., 1971, pp 109–121, the synthesis of ZSM-3 with a composition of $(0.05–0.8)Li_2O:(0.2–0.95)Na_2O:Al_2O_3:(2–6)SiO_2:(0–9)H_2O$.

D. E. W. Vaughan, et al., in "Synthesis and Characterization of Zeolite ZSM-20", in Zeolite Synthesis, Amer. Chem. Soc. 1989, pp 545–559, investigated the effect of potassium on the ZSM-20 material which was synthesized with an organic template cation and reported to have hexagonal and cubic crystal structure. As reported in Table 1, potassium had an adverse impact on the formation of the ZSM-20 structure.

The prior art fails to provide a synthetic composition that is free of lithium and/or organic species which produces a cubic/hexagonal intergrowth of FAU and EMT crystalline metallosilicate having high micropore volume. The present invention as set forth below uniquely achieves these goals to provide a high performance, novel, selective separation adsorbent with new compositions. The utility of the compostion for gas separations, such as the recovery of oxygen from air will be demonstrated.

BRIEF SUMMARY OF THE INVENTION

The present invention is a crystalline metallosilicate composition comprising an EMT structure with a Si/X ratio of less than 2.0 and a micropore volume in the sodium and/or potassium form of at least 0.20 cm$^3$/g, wherein X is selected from the group consisting of aluminum, boron and gallium.

Preferably, the EMT structure is in an intergrowth with a FAU crystal line structure.

Preferably, the intergrowth has an EMT structure content in the range of at least 5% to less than 100% by weight.

Preferably, X is aluminum.

Preferably, the metallosilicate is cation exchanged with lithium, preferably to greater than 80%, more preferably greater than 85%. More preferably, a remaining cation is selected from the group consisting of calcium, magnesium, zinc, nickel, manganese, sodium, potassium and mixtures thereof.

Alternatively, the metallosilicate is cation exchanged with calcium, more preferably combinations of calcium and lithium.

Preferably, the composition is approximately 1.4 Si/Al. More preferably, the composition is approximately 1.0 Si/Al.

Preferably, the composition is prepared from at least one aged gel.

In a preferred embodiment, the present invention is a crystalline aluminosilicate composition comprising an FAU/ EMT intergrowth structure with a Si/Al ratio of less than 2.0, a micropore volume in the sodium and/or potassium form of at least 0.20 cm$^3$/g and a cation exchange of more than 80% with a cation selected from the group consisting of lithium, calcium and mixtures thereof.

The present invention is also a method of synthesizing a crystalline metallosilicate composition having an intergrowth of EMT and FAU structures, comprising; forming a first gel containing $M_{2/n}O$, $Al_2O_3$, >1.5 $SiO_2$ in water wherein M is a metal cation, ageing the first gel at a temperature below the crystallization temperature of its constituents, forming a second gel containing $M_{2/n}O$, $Al_2O_3$, $SiO_2$ in water wherein M is a metal cation, mixing the first gel and the second gel, crystallizing the intergrowth of EMT and FAU structures and recovering it from the mixture of the first and second gels.

Preferably, a cation selected from the group consisting of lithium, calcium and mixtures thereof is ion exchanged with the metallosilicate to greater than 80%. More preferably, the lithium is sourced from lithium chloride and the calcium is sourced from calcium chloride.

Preferably, the mixture of the first gel and the second gel is heated to induce crystallization.

Preferably, both gels are aged prior to mixing the gels.

Preferably, a gel is aged for a period of time in the range of 2 to 144 hours at a temperature below the crystallization of the gel's constituents.

The present invention is also a process of adsorptively separating a more strongly adsorbed gas from a less strongly adsorbed gas in a gas mixture containing a more strongly adsorbed gas and a less strongly adsorbed gas, comprising; contacting the gas mixture with a zone of adsorbent containing crystalline metallosilicate composition having an EMT structure with a Si/X ratio of less than 2.0, a micropore volume in the sodium and/or potassium form of at least 0.20 cm$^3$/g and a cation exchange of more than 50% with a cation selected from the group consisting of lithium, calcium and mixtures thereof, wherein X is selected from the group consisting of aluminum, boron and gallium, selectively adsorbing the more strongly adsorbed gas preferentially to the less strongly adsorbed gas, removing a gas containing the less strongly adsorbed gas and depleted in the more strongly adsorbed gas from the zone and separately removing the more strongly adsorbed gas from the adsorbent.

Preferably, the zone is operated through a series of steps in a cyclical manner comprising; adsorption where the gas mixture contacts the zone at elevated pressure to adsorb the more strongly adsorbed gas until the adsorbent approaches saturation with the more strongly adsorbed gas and the gas containing the less strongly adsorbed gas and depleted in the more strongly adsorbed gas is removed as a product, discontinuing adsorption and desorbing the zone to remove adsorbed more strongly adsorbed gas from the adsorbent to regenerate the adsorbent, repressurizing the zone with a gas rich in the less strongly adsorbed gas, and repeating the series of steps to conduct a continuous process.

Preferably, the steps are conducted in a plurality of parallel connected adsorption beds as the zone wherein when one bed is conducting an adsorption step another bed is being regenerated. More preferably, the plurality of beds is two parallel connected beds.

Preferably, the more strongly adsorbed gas is nitrogen.

Preferably, the less strongly adsorbed gas is oxygen.

Preferably, the gas mixture is air.

Preferably, the adsorption is conducted at a pressure in the range of 10 to 30 psia.

Preferably, the desorption is conducted at a pressure in the range of 0.1 to 7 psia.

Preferably, the gas containing the less strongly adsorbed gas and depleted in the more strongly adsorbed gas is at least 90% oxygen by volume. More preferably, the gas containing the less strongly adsorbed gas and depleted in the more strongly adsorbed gas is at least 93% oxygen by volume.

Preferably, a predominant cation is lithium and a remaining cation is selected from the group consisting of calcium, magnesium, zinc, nickel, manganese and mixtures thereof.

BRIEF DESCRIPTION OF THE DRAWINGS

FIG. 1 (b) is an XRD pattern, in degrees (2θ) vs. intensity (counts) measured with a variable slit, for a composition synthesized in Example 2 of the present invention.

FIG. 1 (c) is an XRD pattern, in degrees (2θ) vs. intensity (counts) measured with a variable slit, for a composition synthesized in Example 3 of the present invention.

DETAILED DESCRIPTION OF THE INVENTION

Figure 1:
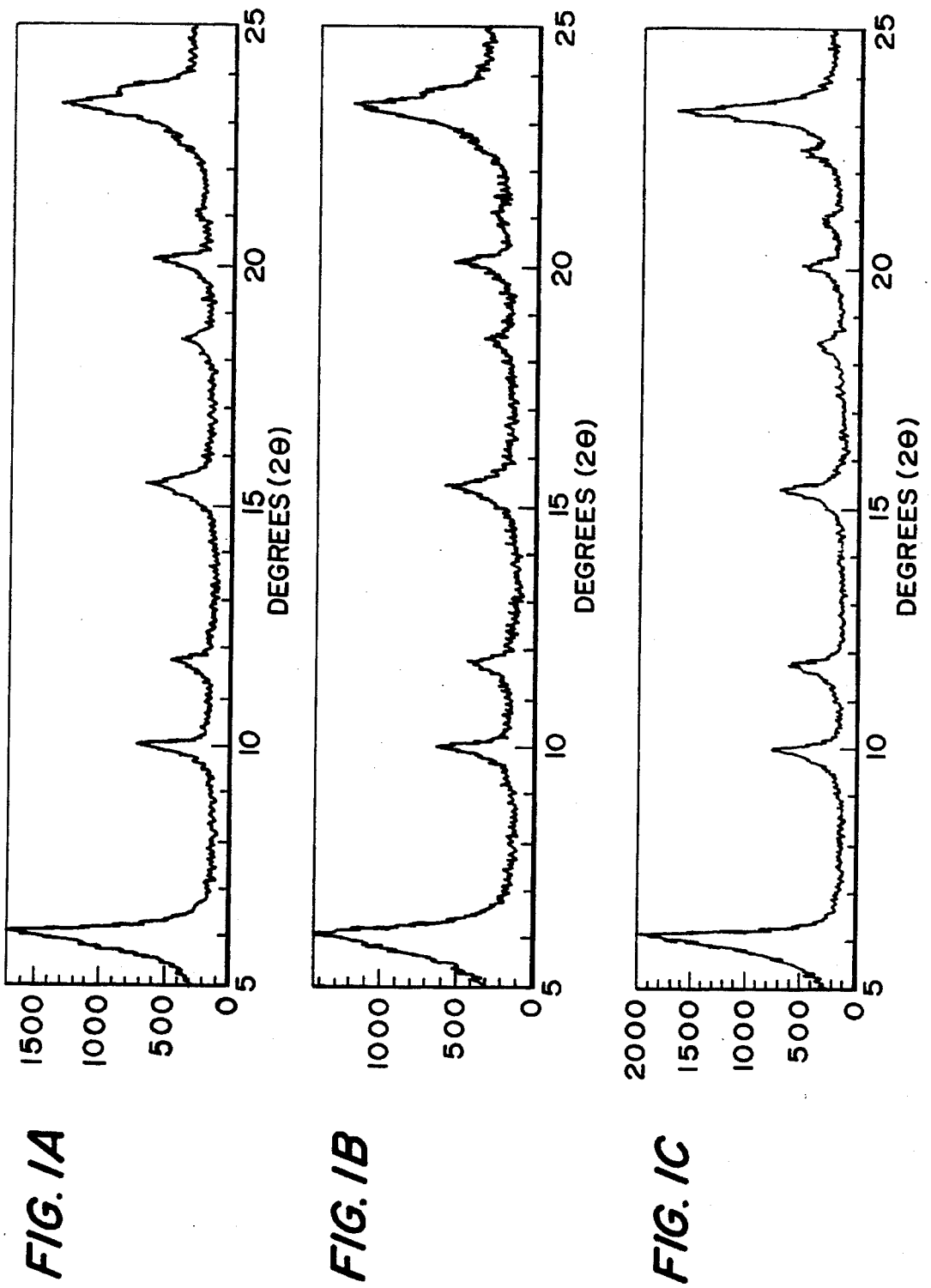
FIG. 1 (a) is an x-ray diffraction (XRD) pattern, in degrees (2θ) vs. intensity (counts) measured with a variable slit, for a composition synthesized in Example 1 of the present invention.

The present invention is directed to a crystalline metallosilicate composition having an EMT, preferably EMT/ FAU, structure having the chemical composition:

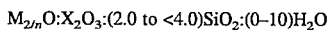

wherein M equals one or more metal cations having a valence of n, such as (0.20–1.0)Na$_2$O:(0.80–0.0)K$_2$O, and X selected from the group consisting of aluminum, gallium and boron and in which the composition as measured in its sodium and/or potassium form has a high micropore volume greater than 0.20 cm$^3$/g. Preferably, the X constitutes aluminum. Preferably, the predominant cation is lithium, calcium or a combination of both with the remaining cation content being sodium, potassium, magnesium, zinc, nickel, manganese and mixtures. Preferably, the predominant cation exchange level is greater than 50% (Cation/X ratio of more than 0.50), more preferably greater than 80%. Although the silicon dioxide to aluminum oxide ratio is in the range of 2:1 to <4.0:1 (Si/Al=1 to <2.0), the preferred compositional ratio approximates <2.8 (Si/Al<1.4), more preferably 2.0 (Si/Al:1).

The compositions of the present invention also include an intergrowth with a metallosilicate FAU structure and can comprise the cubic FAU structure (faujasite) intergrown with a hexagonal EMT structure (hexagonal faujasite) in a zeolitic crystal. The FAU/EMT crystalline zeolites of the present invention are a modified faujasite wherein the cubic faujasite is identified with the structure code FAU with its cubic structure and silicon dioxide to aluminum oxide ratios in the range of 2:1–4.0:1, making it a synthetic faujasite. A related structure with hexagonal symmetry generally recognized under the code EMT. EMT and FAU are recognized zeolitic crystal structures of the Structure Commission of the International Zeolite Association, as set forth at pages 88 and 96 of the ATLAS OF ZEOLITE STRUCTURE TYPES, by W. M. Meier and D. H. Olson (1992) published by Butterworth-Heinemann on behalf of the Commission. FAU structure consists of sodalite cages jointed through double 6-ring in a cubic symmetry. EMT structure consists of sodalite cages jointed through double 6-ring in a hexagonal symmetry. FAU/EMT intergrowths are formed when FAU and EMT phases stack to each other within crystals, wherein the domain sizes and composition of each phase can vary.

FAU and EMT intergrowth crystalline zeolites with silicon dioxide to aluminum oxide ratios less than 4.0:1 and having high micropore volumes in measured in the sodium and/or potassium form have not previously been synthesized. An important aspect in obtaining the intergrowth compositions of the present invention is the synthesis method using a combination of gels in which at least one gel has been allowed to age prior to admixture of the gels, preferably a silica-rich gel with a Si/Al>1.5, and inducing crystallization of the desired crystalline zeolite, in this case, the FAU/EMT structures. The synthesis mixture may contain at least two cations selected from sodium and potassium. A lithium, calcium or mixture of such cations exchange of the cation content of the metallosilicates of the present invention may be conducted after crystallization. The lithium or calcium exchange can result in even greater micropore volumes. Preferably, the synthesis is performed with two gels in which an aluminum-rich gel is mixed with a silicon-rich gel to produce the modified metallosilicates of the present invention.

Ageing of a gel for the purpose of this invention is the process of preparing a gel and maintaining it at a temperature below its crystallization point for sufficient time so that when it is mixed with another gel an intergrowth is ultimately formed under conditions of crystallization. Typically, the ageing period is from 2 hours up to and potentially exceeding 6 days (144 hrs.). In the process of ageing a gel, the time necessary is approximately inversely proportional to the ageing temperature.

The metallosilicates Of the present invention are synthesized without lithium cations, tetramethylammonium, crystallization directing agents or organic templating agents and achieve an unexpected high micropore volume in excess of 0.20 cubic centimeters per gram of the composition using only sodium and/or potassium cations in the gels. Higher micropore volumes can be expected when these metallosilicates are subsequently exchanged with lithium cations.

The present invention is also a method of preparing a crystalline aluminosilicate having an FAU/EMT intergrowth structure, comprising; a) forming a first gel containing M$_2$O, Al$_2$O$_3$, and SiO$_2$ in H$_2$O wherein M is Na or K or a combination of both, b) ageing the first gel for a period of at least 1 hour at room temperature, preferably 20 to 50 hours, c) forming a second gel containing M$_2$O, Al$_2$O$_3$, and SiO$_2$ in H$_2$O wherein M is Na or K or a combination of both, d) mixing the first gel and second gel, e) heating the mixture at temperature below 150° C., preferably between 50° C. and 90° C., and f) recovering a crystalline product from the mixture. The synthesis of FAU/EMT intergrowths can be performed with ratios of reactants within the following ranges:

|  | Broad range | Preferred range |
| --- | --- | --- |
| M/Al | 1.0–9.0 | 1.5–7.5 |
| SiO$_2$/Al$_2$O$_3$ | 2.0–10.0 | 2.2–6.5 |
| H$_2$O/Al$_2$O$_3$ | 100–500 | 120–150 |

The present invention will now be exemplified by specific examples set forth below:

EXAMPLE 1

Synthesis of FAU/EMT Intergrowth with Si/Al=1.45

Synthesis of FAU/EMT intergrowths involved two gels with different Si/Al ratios.

Gel '1' was prepared as follows. 12.78 g of NaOH solution (50 wt. %) was mixed with 49.2 g of deionized water. 6.66 g of Al(OH)$_3$ powder (J. T. Baker) was added to form a sodium aluminate solution. 50.0 g of colloidal silica (Ludox HS40, Dupont) was mixed into the above solution. The mixture was stirred at room temperature for 46 hours. The obtained gel '1' has the following molar composition: Na$_2$O:Al$_2$O$_3$.10 SiO$_2$:140 H$_2$O.

Gel '2' was prepared as follows. 11.46 g of NaOH (97 wt. %) was dissolved in 50.0 g of deionized water. 6.0 g of Al(OH)$_3$ powder (J. T. Baker) was added to form a sodium aluminate solution. 6.93 g of KOH (87.4 wt. %) was dissolved into the above solution. Then, 13.8 g of sodium silicate (PQ 'N' brand) was added to form a gel. The gel was aged at room temperature for 20 hours. The obtained gel '2' has the following molar composition: 5.3 Na$_2$O:1.8 K$_2$O:Al$_2$O$_3$: 2.2 SiO$_2$:122 H$_2$O.

Gel '2' was mixed with a half of gel '1'. The mixture was heated at 60° C. for 70 hours. The crystals were recovered by filtration and washed extensively with deionized water until pH of the filtrate was neutral. The crystalline product has an FAU/EMT intergrowth structure, characterized by the XRD pattern shown in FIG. 1a (top). Chemical analysis shows that the zeolite has a Si/Al ratio of 1.45.

EXAMPLE 2

Synthesis of FAU/EMT Intergrowth with Si/Al=1.36

Gels '1' and '2' were prepared in the same way as in Example 1. Gel '2' was combined with ⅜ of gel '1' to form a mixture. The mixture was heated at 60° C. for 70 hours. The product recovery procedure was the same as described in Example 1. The crystalline zeolite has an FAU/EMT intergrowth structure, characterized by the XRD pattern shown in FIG. 1b (middle). Chemical analysis shows that the zeolite has a Si/Al ratio of 1.36.

EXAMPLE 3

Synthesis of FAU/EMT Intergrowth with Si/Al=1.17

Gels '1' and '2' were prepared in the same way as in Example 1. Gel '2' was combined with ⅛ of gel '1' to form a mixture. The mixture was heated at 60° C. for 70 hours. The formed product was filtered and washed. The crystalline product has an FAU/EMT intergrowth structure, characterized by the XRD pattern shown in FIG. 1c (bottom). Chemical analysis shows that the zeolite has a Si/Al ratio of 1.17.

Examples 1 to 3 show that varying the amount of gel '1' in the mixture revealed products with different Si/Al ratios (shown in Table 1.) and different EMT phase contents (shown by XRD patterns in FIG. 1).

EXAMPLE 4

Synthesis of FAU/EMT Intergrowth Using Different Al Sources

This example uses sodium aluminate instead of $Al(OH)_3$ as an Al source.

Gel '1' was prepared as follows. 3.74 g of NaOH solution (50 wt. %) was mixed with 24.2 g of deionized water. 3.63 g of sodium aluminate (EM Science) was dissolved into the above solution. 25.0 g of colloidal silica (Ludox HS40, Dupont) was added. The mixture was stirred at room temperature for 48 hours. The obtained gel '1' has the following molar composition: $Na_2O:Al_2O_3:10\ SiO_2:140\ H_2O$.

Gel '2' was prepared as follows. 8.69 g of NaOH (97 wt. %) and 6.93 g of KOH (87.4 wt. %) were dissolved in 53.1 g of deionized water. 5.71 g of sodium aluminate (Spectrum) was added to form a solution. 13.8 g of sodium silicate (PQ 'N' brand) was added into the above solution to form a gel. The gel was aged at room temperature for 24 hours. The obtained gel '2' has the following molar composition: $5.3\ Na_2O:1.8\ K_2O:Al_2O_3:2.2\ SiO_2:122\ H_2O$.

Figure 2:
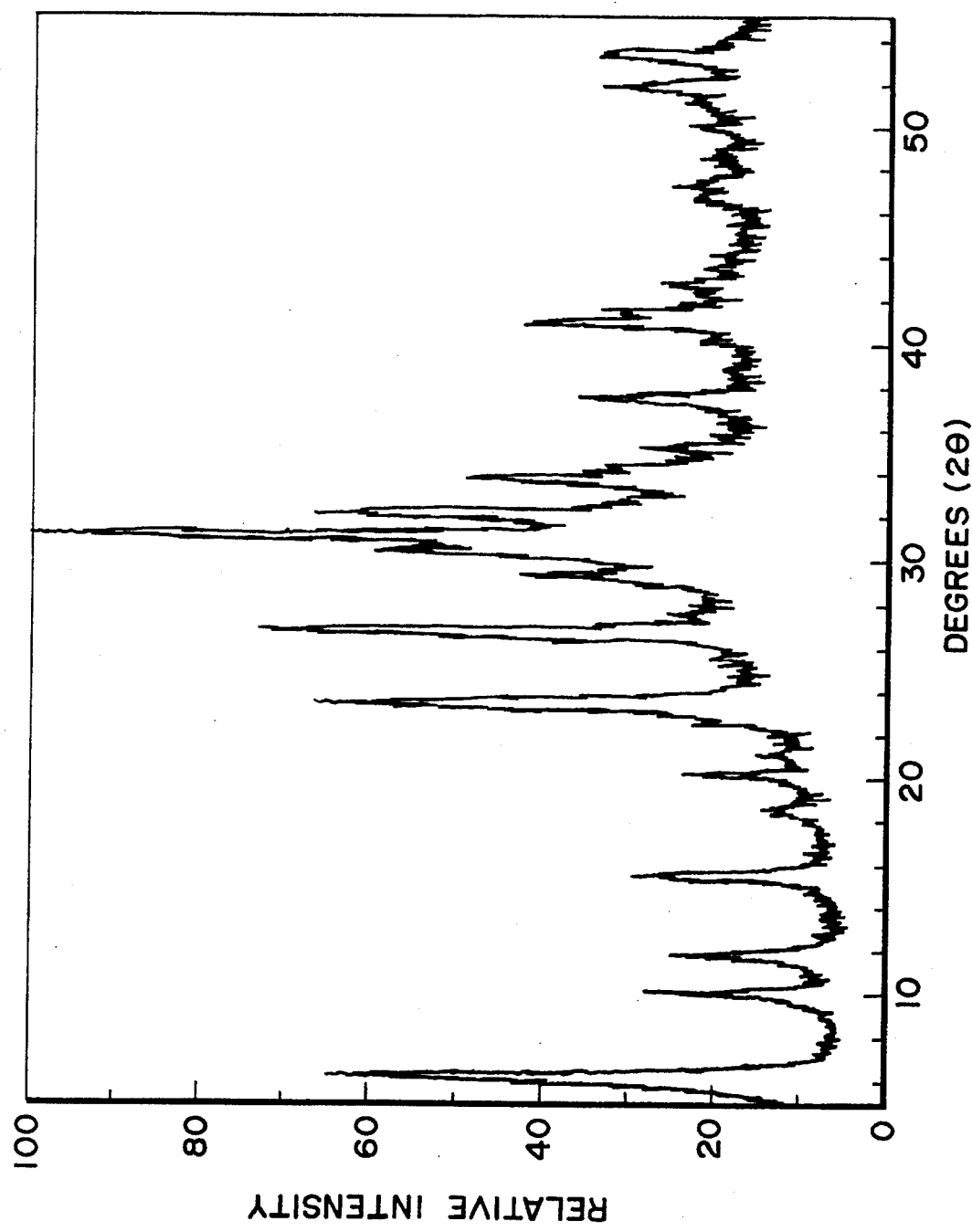
FIG. 2 is an XRD pattern, in degrees (2θ) vs. relative intensity (counts), for a composition synthesized in Example 4 of the present invention.

Gel '2' was mixed with a half of gel '1'. The mixture was heated at 70° C. for 48 hours. The crystals were filtered and washed. The product has an FAU/EMT intergrowth structure, characterized by the XRD pattern shown in FIG. 2. Chemical analysis shows that the zeolite has a Si/Al ratio of 1.17.

EXAMPLE 5

Examples 5 to 7 demonstrate the variation of $SiO_2/Al_2O_3$ ratio for gel '2'.

Gel '1' was prepared in the same way as in Example 1.

Gel '2' was prepared as follows. 8.80 g of NaOH (97 wt. %) and 6.93 g of KOH (87.4 wt. %) were dissolved in 53.8 g of deionized water. 5.71 g of sodium aluminate (Spectrum) was added to form a solution. 12.6 g of sodium silicate (PQ 'N' brand) is added into the above solution to form a gel. The gel was aged at room temperature for 24 hours. The obtained gel '2' has the following molar composition: $5.3\ Na_2O:1.8\ K_2O:Al_2O_3:2.0\ SiO_2:122\ H_2O$.

Gel '2' was combined with a quarter of gel '1'. The mixture was heated at 70° C. for 72 hours, The crystals were filtered and washed. The product has an FAU/EMT intergrowth structure with the XRD pattern similar to that in Example 4, and with an electron micrograph exhibiting hexagonal plate-like crystals typically found in intergrowths of FAU and EMT. Chemical analysis shows that the zeolite has a Si/Al ratio of 1.14.

EXAMPLE 6

Gel '1' was prepared in the same way as in Example 1.

Gel '2' was prepared as follows. 9.13 g of NaOH (97 wt. %) and 6.93 g of KOH (87.4 wt. %) were dissolved in 55.3 g of deionized water. 5.71 g of sodium aluminate (Spectrum) was added to form a solution. 10.0 g of sodium silicate (PQ 'N' brand) is added into the above solution to form a gel. The gel was aged at room temperature for 24 hours. The obtained gel '2' has the following molar composition: $5.3\ Na_2O:1.8\ K_2O:Al_2O_3:1.6\ SiO_2:122\ H_2O$.

Gel '2' was combined with a quarter of gel '1'. The mixture was heated at 70° C. for 72 hours, The crystals were filtered and washed. The product has an FAU/EMT intergrowth structure with the XRD pattern similar to that in Example 4. Chemical analysis shows that the zeolite has a Si/Al ratio of 1.14.

EXAMPLE 7

Gel '1' was prepared in the same way as in Example 1.

Gel '2' was prepared as follows. 9.44 g of NaOH (97 wt. %) and 6.93 g of KOH (87.4 wt. %) were dissolved in 56.8 g of deionized water. 5.71 g of sodium aluminate (Spectrum) was added to form a solution. 7.5 g of sodium silicate (PQ 'N' brand) is added into the above solution to form a gel. The gel was aged at room temperature for 24 hours. The obtained gel '2' has the following molar composition: $5.3\ Na_2O:1.8\ K_2O:Al_2O_3:1.2\ SiO_2:122\ H_2O$.

Gel '2' was combined with a quarter of gel '1'. The mixture was heated at 70° C. for 72 hours, The crystals were filtered and washed. The product has an FAU/EMT intergrowth structure. Chemical analysis shows that the zeolite has a Si/Al ratio of 1.12.

EXAMPLE 8

Synthesis with Statically Aged Gel '1'

Gel '1' was prepared in the same way as in Example 1 except that the gel was statically aged for 48 hours instead of stirring.

Gel '2' was prepared in the same way as in Example 4.

Gel '2' was mixed with a quarter of gel '1'. The mixture was heated at 70° C. for 72 hours. The crystals were filtered and washed. The crystalline product has an FAU/EMT intergrowth structure.

This example has demonstrated that ageing gel '1' can be either static or agitated.

EXAMPLE 9

Synthesis with Non-aged Gel '2'

Gel '1' was prepared in the same way as in Example 1.

Gel '2' was prepared in the same way as in Example 4 except that the gel was not aged.

Gel '2' was mixed with a quarter of gel '1'. The mixture was heated at 70° C. for 72 hours. The crystals were filtered and washed. The product has an FAU/EMT intergrowth structure.

EXAMPLE 10

Synthesis with Non-aged Gel '1'

Gel '1' was prepared in the same way as in Example 1, except that the gel was not aged. Gel '2' was prepared in the same way as in Example 4. Gel '2' was mixed with a quarter of gel '1'. The mixture was heated at 70° C. for 72 hours. The crystals were filtered and washed. The product is a mixture of FAU, chabasite and Na—P. This example has demonstrated that ageing gel '1', a silica-rich gel, is a necessary procedure.

EXAMPLE 11

Adsorption Properties of Li and Ca Exchanged FAU/EMT

The composition of FAU/EMT intergrowth can be ion-exchanged into other cation forms such as Li, Mg, and Ca, etc., and can be used for air separation. The results of $N_2$ and $O_2$ adsorption on Li and Ca ion-exchanged FAU/EMT intergrowths will be demonstrated for this application.

Some FAU/EMT intergrowth samples were ion-exchanged four times at 100° C. with a 1.0M LiCl or 2.0M $CaCl_2$ solution (solid/solution ratio=1 g/25 ml). Adsorption results are in Table 1.

TABLE 1

Adsorption properties for Li and Ca exchanged FAU/EMT intergrowths

| Example | Si/Al[a] | Li(Ca)/Al[b] | Micropore volume[c] ($cm^3/g$) | Adsorption capacity[d] ($cm^3$/g,STP) $N_2$ | $O_2$ |
|---|---|---|---|---|---|
| 1 | 1.45 | 0.91 | 0.33 | 13.5 | 3.9 |
| 2 | 1.36 | 0.93 | 0.32 | 16.4 | 4.2 |
| 3 | 1.17 | 0.97 | 0.30 | 21.0 | 4.0 |
| 4 | 1.17 | 0.97 | 0.30 | 19.0 | 4.0 |
| 5 | 1.14 | 0.97 | 0.31 | 20.7 | 4.1 |
| 6 | 1.14 | 0.97 | 0.31 | 21.4 | 4.1 |
| 7 | 1.12 | 0.97 | 0.30 | 23.0 | 4.2 |
| 5 | 1.14 | (0.51)[e] | 0.30 | 26.7 | 7.7 |
| 7 | 1.12 | (0.52)[e] | 0.30 | 27.5 | 7.5 |

[a]From bulk chemical analysis.
[b]Li/Al ratio is based on residue Na and K cations.
[c]oxygen adsorption capacity measured at −196° C., 20 torr on a McBain-Bakr balance.
[d]Measured at 23° C., 1 atm.
[e]Ca/Al ratio, based on bulk chemical analysis.

The present work differs from the prior art in that: the synthesis does not require organic additives; the synthesis does not require Li, Cs or tetramethylammonium cations; preparation is fairly simple; the gel composition for crystallization is wide, conditions are flexible, and products are stable in the mother liquor; and the products have a high micropore volume (greater than 0.20 $cm^3/g$.

The present invention has been set forth with regard to several preferred embodiments, however the full scope of the present invention should be ascertained from the claims.

We claim:

1. The method of synthesizing a crystalline metallosilicate composition having an intergrowth of EMT and FAU structures, comprising; forming a first gel containing $M_{2/n}O$, $Al_2O_3$, >1.5 $SiO_2$ in water wherein M is a metal cation other than lithium, ageing said first gel at a temperature below the crystallization temperature of its constituents, forming a second gel containing $M_{2/n}O$, $Al_2O_3$, $SiO_2$ in water wherein M is a metal cation other than lithium, mixing said first gel and said second gel, crystallizing said intergrowth of EMT and FAU structures and recovering it from the mixture of the first and second gels.

2. The method of claim 1 wherein the mixture of said first gel and said second gel is heated to induce crystallization.

3. The method of claim 1 wherein both gels are aged prior to mixing said gels.

4. The method of claim 1 wherein said first gel is aged for a period of time in the range of 2 to 144 hours at a temperature below the crystallization of the gel's constituents.

* * * * *

UNITED STATES PATENT AND TRADEMARK OFFICE
CERTIFICATE OF CORRECTION

PATENT NO. : 5,573,745
DATED : Nov. 12, 1996
INVENTOR(S) : Li, et al.

It is certified that error appears in the above-indentified patent and that said Letters Patent is hereby corrected as shown below:

Column 10, line 36, delete the greater than symbol "$>$" and insert in its place the greater than or equal to symbol -- $\geq$ --.

Signed and Sealed this

Eighteenth Day of February, 1997

Attest:

BRUCE LEHMAN

*Attesting Officer*  *Commissioner of Patents and Trademarks*